United States Patent
Bos

[11] 3,980,740
[45] Sept. 14, 1976

[54] DEVICES FOR AERATING LIQUIDS

[75] Inventor: Sietjo B. Bos, Sneek, Netherlands

[73] Assignee: Landustrie Sneek, Machinefabriek Elektrotechniek B.V., Sneek, Netherlands

[22] Filed: Dec. 5, 1974

[21] Appl. No.: 529,842

[30] Foreign Application Priority Data
Dec. 12, 1973 Netherlands.................. 7316997

[52] U.S. Cl................................ 261/91; 210/219; 261/DIG. 75
[51] Int. Cl.² ............................................ B01F 3/04
[58] Field of Search............ 261/91, DIG. 75, 113, 261/112; 210/242, 219, 220, 221 R, 247; 55/257 MP, 257 QV

[56] References Cited
UNITED STATES PATENTS

| | | | |
|---|---|---|---|
| 2,568,749 | 9/1951 | Kittel | 261/113 |
| 2,752,138 | 6/1956 | Kittel | 261/113 |
| 3,345,048 | 10/1967 | Phelps | 261/112 |
| 3,559,964 | 2/1971 | Sell et al. | 261/91 |
| 3,680,845 | 8/1972 | Carlsmith et al. | 261/91 X |
| 3,709,470 | 1/1973 | Auler et al. | 261/91 |
| 3,724,667 | 4/1973 | McKinney | 261/91 X |
| 3,735,926 | 5/1973 | Ravitts | 261/91 X |
| 3,771,724 | 11/1973 | Rose et al. | 261/91 X |
| 3,797,809 | 3/1974 | Sydnor, Jr. | 261/91 |
| 3,836,130 | 9/1974 | Earhart et al. | 261/91 X |

FOREIGN PATENTS OR APPLICATIONS

| | | | |
|---|---|---|---|
| 862,761 | 3/1961 | United Kingdom | 261/91 |
| 1,173,254 | 12/1969 | United Kingdom | 261/91 |

*Primary Examiner*—Tim R. Miles
*Assistant Examiner*—Richard L. Chiesa
*Attorney, Agent, or Firm*—Mason, Mason & Albright

[57] ABSTRACT

A device for aerating liquid in a tank comprises a rotating body having vanes which contact the surface of the liquid. A splash guard is disposed above the body to reflect into the tank liquid droplets discharged upwardly by the body.

1 Claim, 3 Drawing Figures

DEVICES FOR AERATING LIQUIDS

BACKGROUND OF THE INVENTION

1. Field of the Invention.

The present invention relates to devices for aerating liquids.

2. Description of the Prior Art.

In the purification of waste water and other liquids it is usual to aerate the liquid. For this purpose there has been proposed a disc or cone-shaped body disposed substantially in the middle of an aeration tank and mounted on a vertical shaft, the body being provided with vanes adapted to contact the liquid surface in the aeration tank, so as to disturb the liquid surface on rotation of said body for introducing air into the liquid.

A disadvantage of such surface aerators in that liquid droplets are displaced upwardly from the surface of the liquid by the body and may fall outside the confines of the aeration tank, which will lead to pollution and contamination of the surroundings. Screening by covering the aeration tank is expensive, and will also obstruct the access of air to the liquid.

SUMMARY OF THE INVENTION

According to the present invention, there is provided in a device for aerating liquid within a tank, a rotatable body, said body including vanes, means mounting said body for rotation about a substantially vertical axis, said vanes contacting the surface of the liquid in the tank such that the surface of the liquid is disturbed upon rotation of the body whereby the liquid is aerated, and a guard located above the body and extending transversely to the rotational axis of the body, the height of the guard above the body and the size of the guard being such that liquid displaced upwardly from the surface of the liquid during rotation of the body is reflected downwardly by the guard within the area defined by the tank, said guard including means defining at least one air supply opening.

BRIEF DESCRIPTION OF THE DRAWING

Embodiments of the invention will now be described, by way of example only, with reference to the accompanying diagrammatic drawing, in which.

DESCRIPTION OF THE PREFERRED EMBODIMENTS

Figure 1:
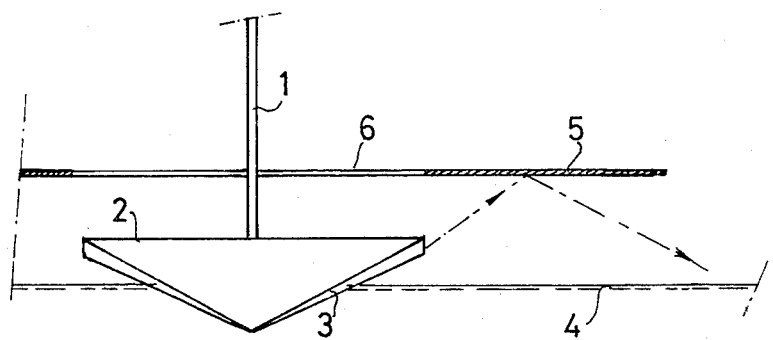
FIG. 1 is a section of an aeration device according to the present invention.

The device shown in FIG. 1 comprises a conical body 2 mounted on a substantially vertical shaft 1, and provided at its lower side with vanes 3 which are, at least partially, submerged in liquid within an aeration tank so as to disturb the liquid surface 4 and, thus, to mix it with air. Such aeration will, however, lead to a rather violent movement of the liquid, with the result that the liquid may splash over the confines of the aeration tank in which the liquid is contained, which will lead to pollution of the surroundings.

In order to avoid this effect, a guard 5 is arranged at a predetermined height above the highest point of the body 2. The height of the guard 5, and the distance of the outer edge of the guard from the shaft 1 are chosen so that any liquid discharged upwardly from the surface of the liquid within the tank is reflected downwards within the confines of the aeration tank. In its center portion, the guard 5 is provided with an opening 6 having dimensions which substantially correspond with those of the body 2. Air can enter through the opening 6, and the body 2 lies directly beneath the opening so that no liquid will be discharged through the opening.

Figure 2:
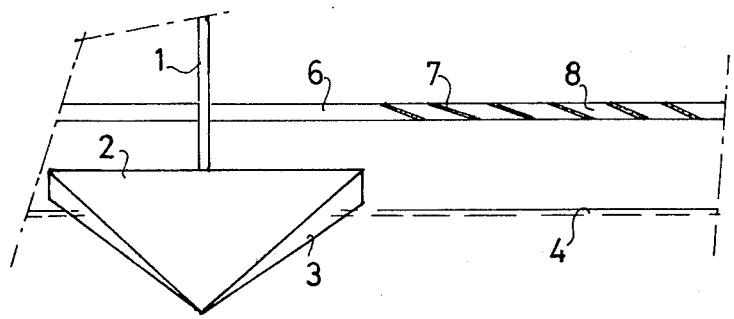
FIG. 2 is a section of another embodiment of the device.
Figure 3:
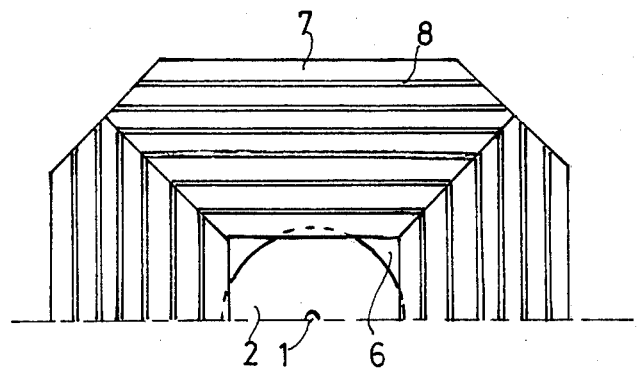
FIG. 3 is a plan view of the aerator shown in FIG. 2.

FIGS. 2 and 3 show an advantageous embodiment of the splashing guard. This guard consists of groups of mutually parallel slats 7 which are symmetrically arranged around the shaft 1, openings 8 being defined between adjacent slats. The slats 7 have a predetermined inclination with respect to the horizontal plane, this inclination being such that, as viewed in the direction in which upwards discharge of liquid occurs, each slat covers the outer adjacent opening 8 so that liquid is not discharged through the openings 8.

The advantage of this construction is that additional air can flow inwardly through the openings 8 and furthermore, since air will be entrained with the liquid droplets reflected by the slats, a certain suction effect will be obtained so that the assembly operates in the manner of an ejector pump.

The inclination of the slats 7 can, furthermore, gradually increase outwardly in order to obtain a better confinement of the reflected drops.

Instead of such an assembly of slats, the guard can comprise rows of lips punched out from a plate. The lips in alternate rows can be off-set so that screening of the openings situated behind the lips is obtained, and any liquid discharged upwardly by the body will meet a lip or plate part against which reflection takes place. The openings will also provide for additional air supply. The inclination of the lips may gradually increase outwardly.

A disc-shaped body may be used as an alternative to the conical body 2 shown in the drawings.

The guard shown in the drawing is relatively inexpensive and will not cause obstruction of the air flow to the liquid.

What is claimed is:

1. In a device for aerating liquid within an open tank, a rotatable body having vanes, shaft means mounting the body such that the body contacts the surface of the liquid, said shaft means extending vertically and being rotatably driven whereby to cause the body to agitate the liquid surface, said vanes being unconfined externally whereby liquid droplets are displaced upwardly and outwardly from the liquid surface during rotation of the body, and a splash guard mounted above the body and extending in a plane generally parallel to the surface of the liquid to provide a surface facing the surface of the liquid, said splash guard being stationary and having a central opening, the width of said opening being substantially equal to the diameter of the body, said shaft extending through said opening, the height of the guard above the surface of the liquid, and the lateral extent of the guard being such that said liquid droplets displaced upwardly and outwardly from the liquid surface impinge against the said surface of the guard to be reflected thereby downwards into the liquid within the tank, said guard having a plurality of portions inclined to the plane of the guard, each of said portions being in the form of a solid slat having an undersurface which faces inwardly of the guard towards said surface to reflect liquid droplets downwards into the liquid, said portion being substantially continuous and extending around substantially the entire outer periphery of the guard and being spaced from another one of said portions of the guard adjacent thereto, said central opening and the space defined between the said solid portions and the said adjacent portions of the guard constituting air flow openings.

* * * * *